United States Patent [19]
Huang

[11] Patent Number: 5,788,445
[45] Date of Patent: Aug. 4, 1998

[54] STRIP FOR SUPPORTING NAILS

[76] Inventor: Shih Chang Huang, No. 134, Yiau San Street, San Min Chu, Kaoshiung, Taiwan

[21] Appl. No.: 843,687

[22] Filed: Apr. 10, 1997

[51] Int. Cl.⁶ .................................... F16B 15/08; B65D 85/24
[52] U.S. Cl. .......................... 411/442; 411/444; 411/966; 206/347
[58] Field of Search .................................... 411/442, 443, 411/444, 966; 206/345, 346, 347

[56] References Cited

U.S. PATENT DOCUMENTS

| | | | |
|---|---|---|---|
| 3,944,068 | 3/1976 | Maier et al. | 411/442 |
| 5,509,768 | 4/1996 | Hon | 411/444 X |
| 5,522,687 | 6/1996 | Chen | 411/442 X |

*Primary Examiner*—Neill R. Wilson

[57] ABSTRACT

A strip includes a number of triangular holes each formed by a triangular peripheral wall for engaging with fasteners and for decreasing the contact area between the strip and the fasteners. The triangular peripheral walls each includes three surfaces each having a slit for increasing the resilience of the triangular peripheral walls and for allowing the triangular peripheral walls to resiliently supporting the fasteners in place and for allowing the fasteners to be easily disengaged from the strip when the fasteners are punched relative to the strip.

4 Claims, 3 Drawing Sheets

STRIP FOR SUPPORTING NAILS

This application is related to application Ser. No. 08/071,422, filed Jun. 9, 1997.

BACKGROUND OF THE INVENTION

1. Field of the Invention

The present invention relates to a strip, and more particularly to a strip for supporting nails.

2. Description of the Prior Art

Typical strips for supporting nails comprise a strip body having a number of holes for engaging with nails. The strips are engaged in a nailing or stapling mechanism for supplying the nails into the nailing mechanism and for allowing the nails to be driven out of the strips. However, the strip will be broken when the nails are punched out of the strip.

The present invention has arisen to mitigate and/or obviate the afore-described disadvantages of the conventional strips.

SUMMARY OF THE INVENTION

The primary objective of the present invention is to provide a strip for preventing the strip body to be broken when the nails are driven out of the strip body.

In accordance with one aspect of the invention, there is provided a strip comprising a strip body including a plurality of triangular holes each defined by a triangular peripheral wall for engaging with fasteners and for decreasing a contact area between the strip body and the fasteners, the triangular peripheral walls each including three surfaces each having a slit for increasing a resilience of the triangular peripheral walls and for allowing the triangular peripheral walls to resiliently supporting the fasteners in place.

The surfaces of the triangular peripheral walls each includes a coupling portion, the slits are ended at the coupling portions. The coupling portions may be easily broken when the fasteners are punched relative to the strip body, for allowing the fasteners to be easily disengaged from the strip body.

The strip body includes a plurality of openings communicating with the slits for increasing the resilience of the triangular peripheral walls.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
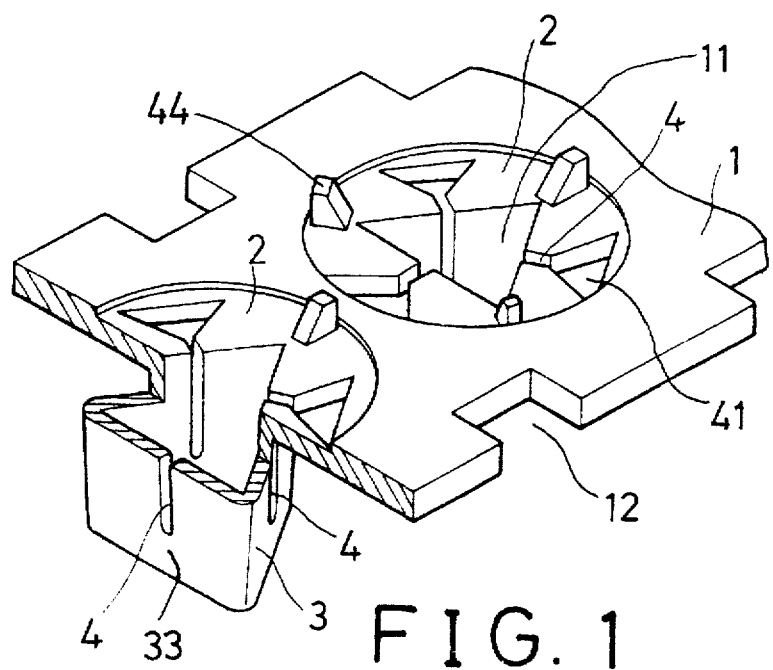
FIGS. 1, 2, 3 are partial perspective views illustrating three applications of a strip in accordance with the present invention.
Figure 4:
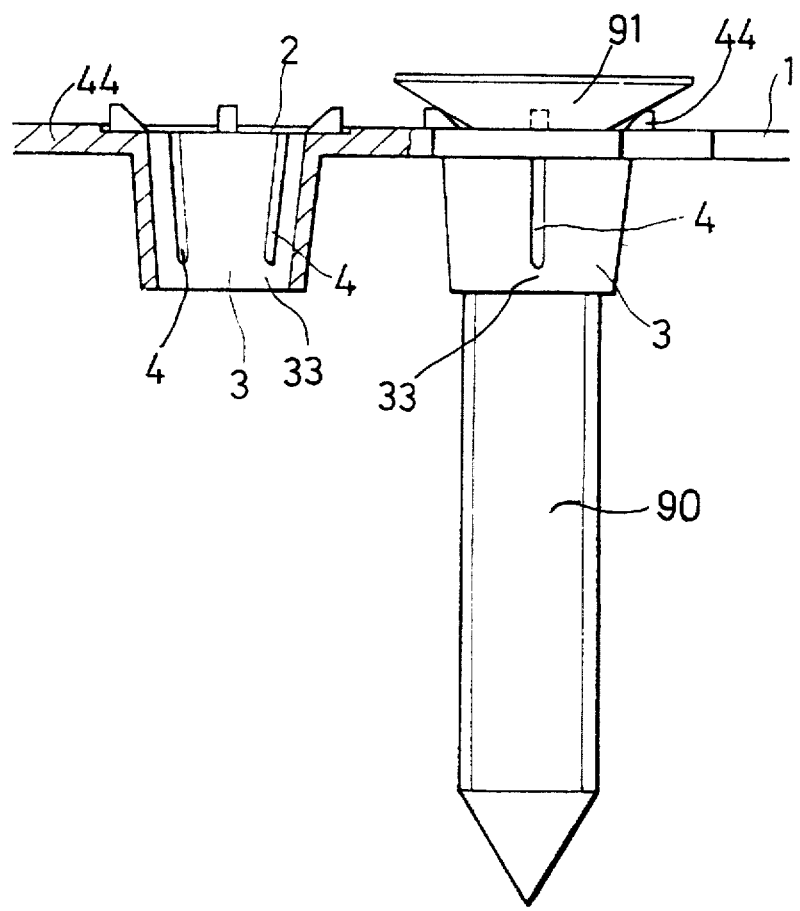
FIG. 4 is a partial cross sectional view of the strip, illustrating the application of the strip.
Figure 2:
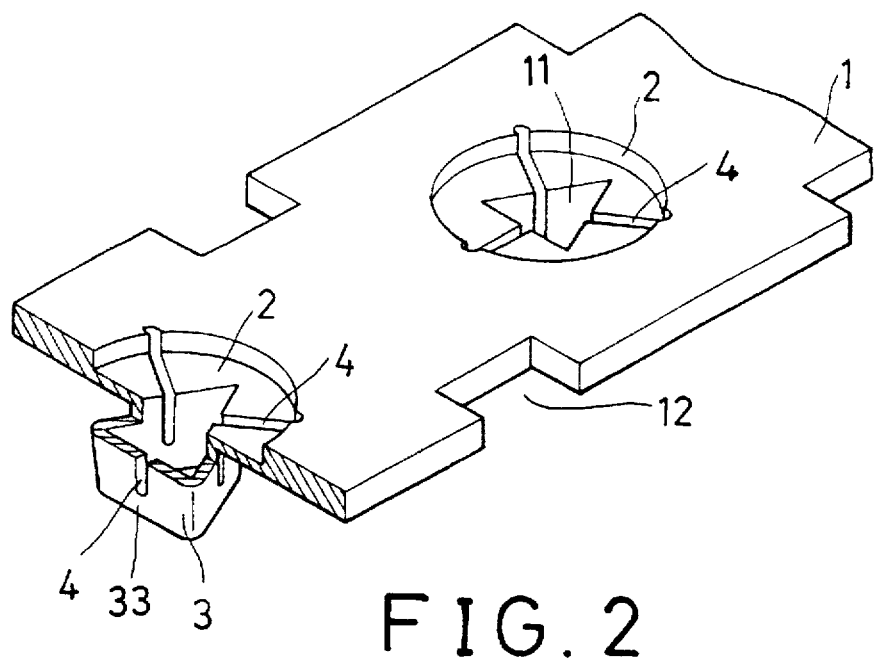
Figure 5:
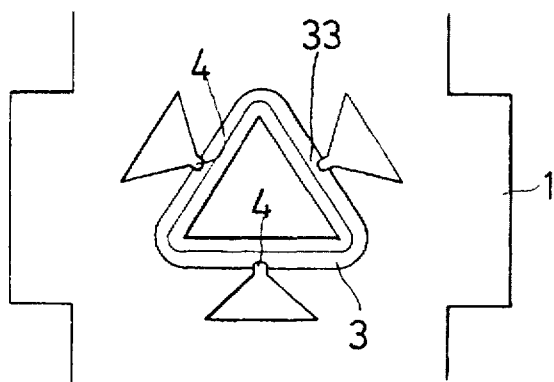
FIGS. 5, 6 are bottom views of the strip, illustrating the operation of the strip.

Referring to the drawings, and initially to FIGS. 1, 4 and 5, a strip in accordance with the present invention comprises a strip body 1 including two side edges each having a number of notches 12 for engaging with a nailing mechanism and for allowing the strip body 1 to be driven by the nailing mechanism. The strip body 1 includes a number of triangular holes 11 each defined by a triangular peripheral wall 3, for engaging with fasteners, such as bolts or nails or screws 90, and for decreasing the contact area between the strip body 1 and the fastener 90. The strip body 1 includes a number of depressions 2 for engaging with the cone-shaped head 91 of the fasteners 90 and for decreasing the engaging area between the head 91 and the strip body 1, such that the head 91 can be resiliently supported in place. The triangular walls 3 each includes three surfaces each having one or more slits 4 ending at the coupling portions 33 which are formed in the bottom of the triangular peripheral walls 3 so as to further increase the resilience applied onto the head 91 of the screw 90.

Figure 3:
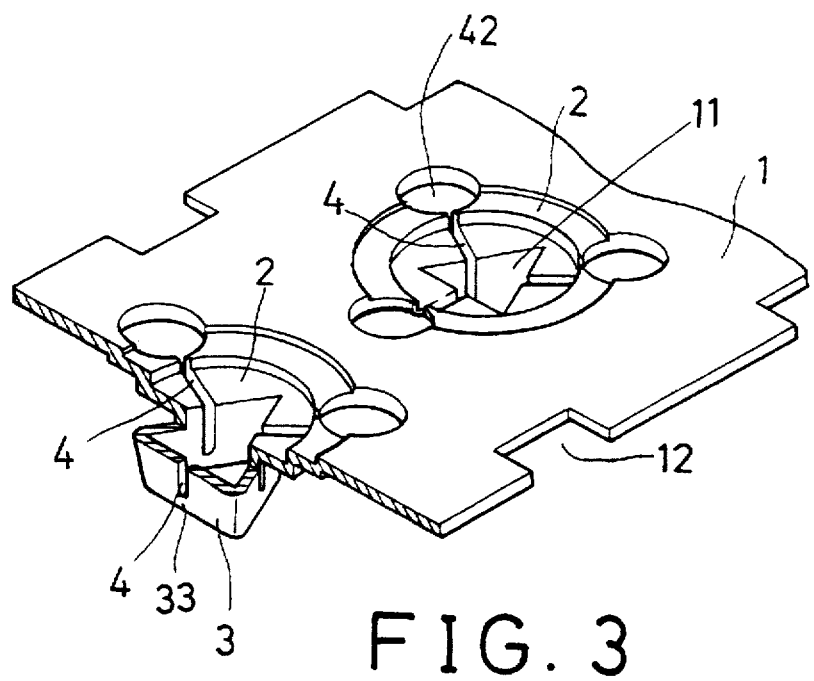
Figure 7:
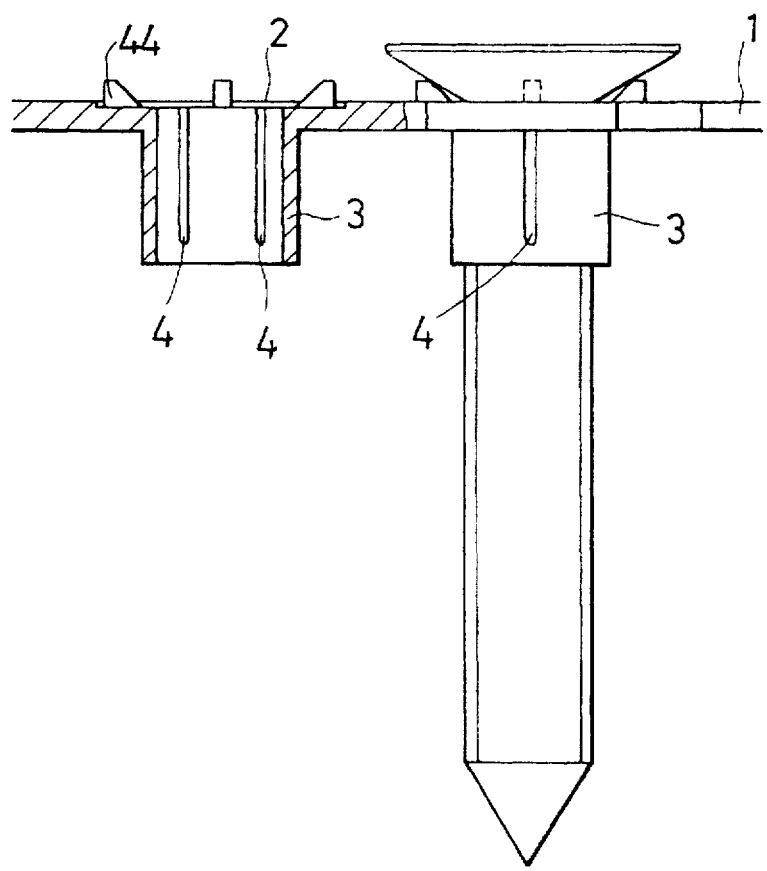
FIG. 7 is a partial cross sectional view similar to FIG. 4, illustrating another application of the strip.

The strip body 1 further includes one or more openings 41, 42 communicating with the slits 4 for further increasing the resilience of the strip body 1 and for allowing the screws 90 to be easily disengaged from the strip body 1. The openings 41, 42 may be triangular in shape (FIG. 1) or circular in shape (FIG. 3) or other shapes. The strip body 1 may further include a number of bulges 44 for engaging with the head 91 of the fastener 9 (FIGS. 1, 4, 7). The slits 4 may be slightly inclined (FIG. 4) or vertical (FIG. 7).

Figure 6:
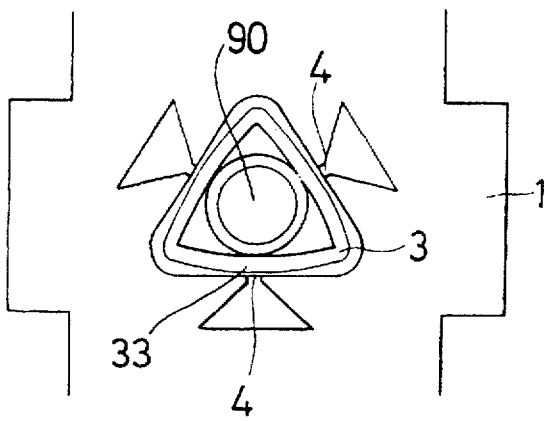

As shown in FIGS. 5 and 6, the fastener 90 may be resiliently secured and supported in the wall 3 which may be suitably bent or expanded for allowing the fastener 90 to be easily disengaged from the wall 3. The coupling portions 33 may be broken while the fastener 90 is punched through the wall 3.

Accordingly, the strip in accordance with the present invention may resiliently support the fasteners for allowing the fasteners to be easily disengaged from the strip.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A strip comprising:
    a strip body including a plurality of triangular holes and including a plurality of triangular peripheral walls dependent downward from said strip body for defining said triangular holes and for engaging with fasteners and for decreasing a contact area between said strip body and the fasteners, said triangular peripheral walls each including three surfaces each having a slit extended axially along said surfaces for increasing a resilience of said triangular peripheral walls and for allowing said triangular peripheral walls to resiliently support the fasteners in place.

2. The strip according to claim 1, wherein said surfaces of said triangular peripheral walls each includes a coupling portion formed below said slits, said slits are terminated at said coupling portions.

3. The strip according to claim 1, wherein said slits each includes an upper portion, said strip body includes a plurality of openings communicating with said upper portions of said slits for increasing the resilience of said triangular peripheral walls.

4. The strip according to claim 3, wherein said slits each further includes a radial portion formed in said strip body and formed between said upper portions of said slits and with said openings.

* * * * *